United States Patent
Garcia Tormo et al.

(10) Patent No.: US 10,468,967 B2
(45) Date of Patent: Nov. 5, 2019

(54) ESTIMATING AN AVERAGE VALUE OF AN INDUCTOR CURRENT FOR SWITCHED-MODE POWER CONVERTERS

(71) Applicant: KONINKLIJKE PHILIPS N.V., Eindhoven (NL)

(72) Inventors: Albert Garcia Tormo, Eindhoven (NL); Hendrik Huisman, Eindhoven (NL); Peter Luerkens, Eindhoven (NL); Bernd Ackermann, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/737,060

(22) PCT Filed: Jun. 15, 2016

(86) PCT No.: PCT/EP2016/063663
§ 371 (c)(1),
(2) Date: Dec. 15, 2017

(87) PCT Pub. No.: WO2017/001190
PCT Pub. Date: Jan. 5, 2017

(65) Prior Publication Data
US 2018/0166970 A1 Jun. 14, 2018

(30) Foreign Application Priority Data
Jun. 29, 2015 (EP) ..................................... 15174300

(51) Int. Cl.
*H02M 1/14* (2006.01)
*H02M 1/00* (2006.01)
*H02M 3/04* (2006.01)

(52) U.S. Cl.
CPC ............... *H02M 1/14* (2013.01); *H02M 1/00* (2013.01); *H02M 3/04* (2013.01); *H02M 2001/0009* (2013.01)

(58) Field of Classification Search
None
See application file for complete search history.

(56) References Cited

U.S. PATENT DOCUMENTS 7,432,695 B2 * 10/2008 Salerno ................ H02M 3/156
                                                323/277
8,581,567 B2 * 11/2013 Shimizu ............... H02M 3/156
                                                323/283
(Continued)

FOREIGN PATENT DOCUMENTS

| KR | 20140018488 A | 2/2014 |
|----|---------------|--------|
| WO | 2007107919 A1 | 9/2007 |
| WO | 2008022443 A1 | 2/2008 |

OTHER PUBLICATIONS

Park, Hyun-Hee et al "A Fully Integrated Wide-Band PIO Controller with Capacitor-Less Compensation for Step-Down DC-DC-Converter", Circuits and Systems (ISCAS), 2011 IEEE International Symposium on IEEE, pp. 506-509, 2011.

*Primary Examiner* — Jue Zhang
*Assistant Examiner* — Henry E Lee, III
(74) *Attorney, Agent, or Firm* — Larry Liberchuk

(57) ABSTRACT

The present invention relates to a device (1) for estimating an average value of an inductor current for switched-mode power converters (100), the device (1) comprising: a sensor (10), which is configured to measure an inductor voltage (v_L) and an inductor current (i_L); a ripple-suppressor (20), which is configured to provide an estimated inductor current ripple (EIR) based on the measured inductor voltage (v_L); and a current-corrector (30), which is configured to provide a corrected inductor current (i_Lc) based on the (Continued)

estimated inductor current ripple (EIR) and the measured inductor current (i_L).

10 Claims, 6 Drawing Sheets

(56) References Cited

U.S. PATENT DOCUMENTS

| | | | |
|---|---|---|---|
| 2011/0062932 A1* | 3/2011 | Hawkes | H02M 3/156 323/288 |
| 2011/0311027 A1 | 12/2011 | Rexhausen | |
| 2012/0194161 A1 | 8/2012 | Latham | |
| 2013/0015830 A1 | 1/2013 | Zhang | |
| 2017/0237345 A1* | 8/2017 | Manlove | H02M 3/156 323/274 |

* cited by examiner

ESTIMATING AN AVERAGE VALUE OF AN INDUCTOR CURRENT FOR SWITCHED-MODE POWER CONVERTERS

CROSS-REFERENCE TO PRIOR APPLICATIONS

This application is the U.S. National Phase application under 35 U.S.C. § 371 of International Application No. PCT/EP2016/063663, filed on Jun. 15, 2016, which claims the benefit of European Patent Application No. 15174300.2, filed on Jun. 29, 2015. These applications are hereby incorporated by reference herein.

FIELD OF THE INVENTION

The present invention relates to ripple mitigation in inductor current measurements in switched-mode power converters. In particular, the present invention relates to a device for estimating an average value of an inductor current for switched-mode power converters and to a method for estimating an average value of an inductor current for switched-mode power converters.

BACKGROUND OF THE INVENTION

Switched-mode power converters are very popular in power applications because of their high efficiency. Often, a limitation in these switched-mode power converters is their bandwidth, which is usually limited to about $1/10$ of the switching frequency. In order to maximize the bandwidth, a fast wide band current control loop is generally nested inside a slower narrow band voltage control loop.

Depending on the converter dimensioning, the ripple in the current waveform can be large. The current control loop must then have enough rejection so that the ripple at the modulator's input is small enough. Simply dimensioning for the required attenuation at a switching frequency may not work, since this may also result in a current control loop with very limited bandwidth. Whilst this corresponds to averaging over a long period of time, e.g. more than a few ten of switching periods of the converter, it is desirable to average over short periods of time, preferably in the order of the switching period of the converter. Conventional solutions for processing a current waveform with large ripples yield an average current waveform with a certain delay with respect to the actual current waveform. This delay restricts the bandwidth of the current control loop.

WO 2007/107919 A1 describes a supply circuit comprising an inductor coupled to switching means and comprising a capacitor that is provided with an impedance located between the inductor and the capacitor, with a current injector and with a feedback loop comprising a converter for controlling the current injector for compensating a ripple in an output voltage across the capacitor. The impedance allows injection of a compensating current at a location different from an output location.

HYUN-HEE PARK ET AL: "A fully integrated wideband PID controller with capacitor-less compensation for step-down DC-DC converter", CIRCUITS AND SYSTEMS (ISCAS), 2011 IEEE INTERNATIONAL SYMPOSIUM ON, IEEE, 15 May 2011, pages 506-509 discloses how a fully integrated wide-band PID controller is implemented for a buck DC-DC converter operating in voltage mode.

KR 2014 0018488 A discloses a buck converter which uses a sensor for detecting the instantaneous value of the inductor current.

US 2013/015830 discloses alternative ways of detecting the inductor current in a buck converter.

SUMMARY OF THE INVENTION

There may be a need to improve control devices and methods for controlling power converters based on more accurate measurement methods.

These needs are met by the subject-matter of the independent claims. Further exemplary embodiments are evident from the dependent claims and the following description.

An aspect of the present invention relates to a device for estimating an average value of an inductor current or corrected inductor current for switched-mode power converters, the device comprising: a sensor, which is configured to measure an inductor voltage and an inductor current; a ripple-suppressor, which is configured to provide an estimated inductor current ripple based on the measured inductor voltage; and a current-corrector, which is configured to provide the corrected inductor current based on the estimated inductor current ripple and the measured inductor current wherein the ripple-suppressor is configured to reset the integration whenever the inductor voltage is switched and wherein the ripple-suppressor is configured to shift, within a switching state of the converter, the estimated inductor current ripple (EIR) downward with an offset equal to about half of the peak inductor ripple if it has a positive slope and upward with the same offset if it has a negative slope and in this manner providing a shifted inductor current ripple (SIR).

The 'an average value of an inductor current' normally refers to very slow variations of the current; according to this invention, everything up to the switching frequency (inverse of the period T) is measured. Very slow variations are thus much longer than the period T. Much longer means larger than 10 times T.

The device for estimating an average value of an inductor current may advantageously provide a ripple-cancelation block which generates an estimation of the current ripple from voltage waveforms.

The device for estimating an average value of an inductor current advantageously provides an output, representing an estimation of the ripple current. The ripple current may then be subtracted from the measured inductor current thereby yielding the average current waveform with no delay.

In other words, the device advantageously provides that no additional delay besides the intrinsic delay of the analog-to-digital converters and the time constants of the analog measurement circuits is induced.

In other words, the device is configured to estimate the average value of a signal consisting of low-frequency components (i.e. the part of the signal to be estimated by this proposal) and high-frequency components (i.e. the ripple). This is eliminating the latter to obtain the former. The device is configured to be applied also if an exact measurement of the current is possible.

The ripple cancelation block in form of the device may measure the inductor voltage and may generate an estimation of the inductor current ripple. The estimation of the inductor current ripple can be generated by simply integrating the inductor voltage and dividing the integral by the inductance of the inductor.

This integration as performed by the device is reset whenever the inductor voltage is switched so that there are no accumulative errors. In topologies comprising more than one switch (e.g. parallel connection of several converters), switching one switch may not affect all inductors. This results in a discontinuous triangle-like waveform. In order to cancel the ripple, the discontinuous triangle-like waveform is shifted so that it has an average below a certain level or an average of zero also locally, within a rising or a falling slope, i.e. within each switching state of the converter.

A constant shift or an approximately constant shift is applied within each switching state of the converter, but the shift applied to the waveform varies from one switching state to the next switching state. In other words, only the ripple is to be cancelled, not the average value of the discontinuous triangle-like waveform. The proper shift can be computed by the device using the instantaneous value of the duty cycle and the inductor voltage.

According to a further, second aspect of the present invention, a power converter is provided, the power converter comprising an inductor with an inductor current flowing through the inductor and a device for estimating an average value of the inductor current according to the first aspect of the present invention or according to any implementation form of the first aspect of the present invention.

According to a further, third aspect of the present invention, a high power pre-regulator is provided, the high power pre-regulator for X-ray generation comprising a power converter according to the second aspect of the present invention or any implementation form of the second aspect of the present invention.

According to a further, fourth aspect of the present invention, a method for estimating an average value of an inductor current or corrected inductor current for switched-mode power converters is provided, the method comprising the steps of:
a) Measuring an inductor voltage and an inductor current;
b) Providing an estimated inductor current ripple based on the measured inductor voltage; and
c) Providing the corrected inductor current based on the estimated inductor current ripple and the measured inductor current, by resetting the integration whenever the inductor voltage is switched and shifting, within a switching state of the converter, the estimated inductor current ripple (EIR) downward with an offset equal to about half of the peak inductor ripple if it has a positive slope and upward with the same offset if it has a negative slope and in this manner providing a shifted inductor current ripple (SIR).

According to an exemplary embodiment of the present invention, the ripple-suppressor is configured to provide the estimated inductor current ripple by integration of the measured inductor voltage. This advantageously allows an instantaneous prediction of the corrected inductor current.

According to an exemplary embodiment of the present invention, the ripple-suppressor is configured to provide the estimated inductor current ripple by scaling the integration of the measured inductor voltage with an inductance of an inductor of the power converter. This advantageously allows adjusting the estimation of the average value of the inductor current according to the inductors of the power converter.

According to the present invention, the ripple-suppressor is configured to reset the integration whenever the inductor voltage is switched. This advantageously allows providing an improved estimation of the average value of the inductor current.

According to the present invention, the ripple-suppressor is configured to shift the estimated inductor current ripple providing a shifted inductor current ripple. The shifting may be conducted so that it has an average below a certain level. This advantageously allows obtaining the inductor average current without delaying the signal.

According to an exemplary embodiment of the present invention, the current-corrector is configured to subtract the shifted inductor current ripple from the measured inductor current providing the corrected inductor current.

According to an exemplary embodiment of the present invention, the ripple-suppressor is configured to shift the estimated inductor current ripple using an instantaneous value of a duty cycle of the power converter. This advantageously allows obtaining the inductor average current without delaying the signal.

According to an exemplary embodiment of the present invention, the ripple-suppressor is configured to shift the estimated inductor current ripple using an inductor voltage of the power converter. This advantageously allows estimating and computing the average current waveform with no delay.

According to an exemplary embodiment of the present invention, the ripple-suppressor is configured to shift the estimated inductor current ripple using the formula:

$$\Delta i_{LPP} = \frac{v_L}{L} DT \rightarrow \text{Offset} = -\frac{v_L}{2L} DT.$$

In this formula, $\Delta i_{LPP}$ denotes the peak-to-peak inductor ripple, $v_L$ is the inductor voltage, L the inductance of the inductor, D denotes the duty cycle and T the period, Offset refers to the calculated shift. This formula provides only the size of the calculated shift. Within a switching state of the converter the estimated inductor current ripple is shifted downward if it has a positive slope and it is shifted upward if it has a negative slope.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory). A computer-readable medium may also be a data communication network, for example the Internet, which allows downloading a program code.

The methods, systems and devices described herein may be implemented as software in a Digital Signal Processor, DSP, in a micro-controller or in any other side-processor such as a hardware circuit within an application specific integrated circuit, ASIC.

The present invention can be implemented in digital electronic circuitry, or in computer hardware, firmware, software, or in combinations thereof, e.g. in available hardware of a device or in new hardware dedicated for processing the methods described herein.

BRIEF DESCRIPTION OF THE DRAWINGS

A more complete appreciation of the present invention and the attendant advantages thereof will be more clearly understood by reference to the following schematic drawings, which are not to scale, wherein.

DETAILED DESCRIPTION OF EMBODIMENTS

Figure 1:
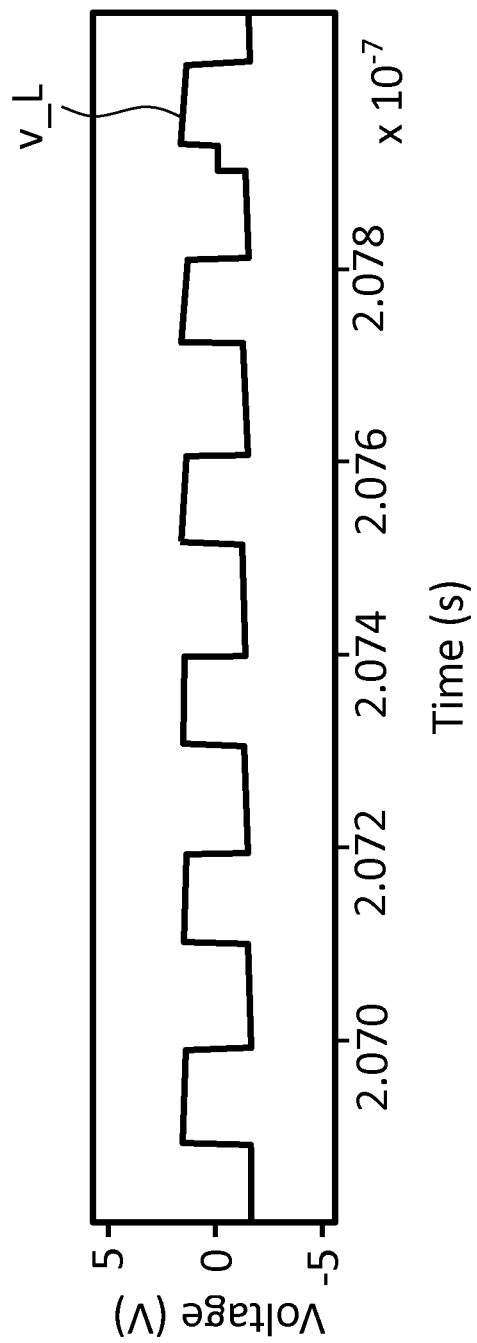
FIG. 1 shows a schematic diagram of a measured inductor voltage over time according to an example.

The illustration in the drawings is purely schematic and does not intend to provide scaling relations or size information. In different drawings or figures, similar or identical elements are provided with the same reference numerals. Generally, identical parts, units, entities or steps are provided with the same reference symbols in the description.

The term ripple may refer to unwanted residual periodic variation of an output, e.g. current output or output voltage of a supply. The ripple may be due to incomplete suppression of any kind of alternating waveforms within the power supply.

FIG. 1 shows a schematic diagram of the measured inductor voltage over time according to an exemplary embodiment of the present invention. The inductor voltage v_L is measured over time and has a sign-changing amplitude of about ±1.5 V with characteristic deviations due to parasitic elements, as real circuit elements are nonideal. The y-axis of the diagram as shown in FIG. 1 depicts the voltage in Volts ranging from −5 V to +5 V, the x-axis as shown in FIG. 1 gives the time in seconds.

Figure 2:
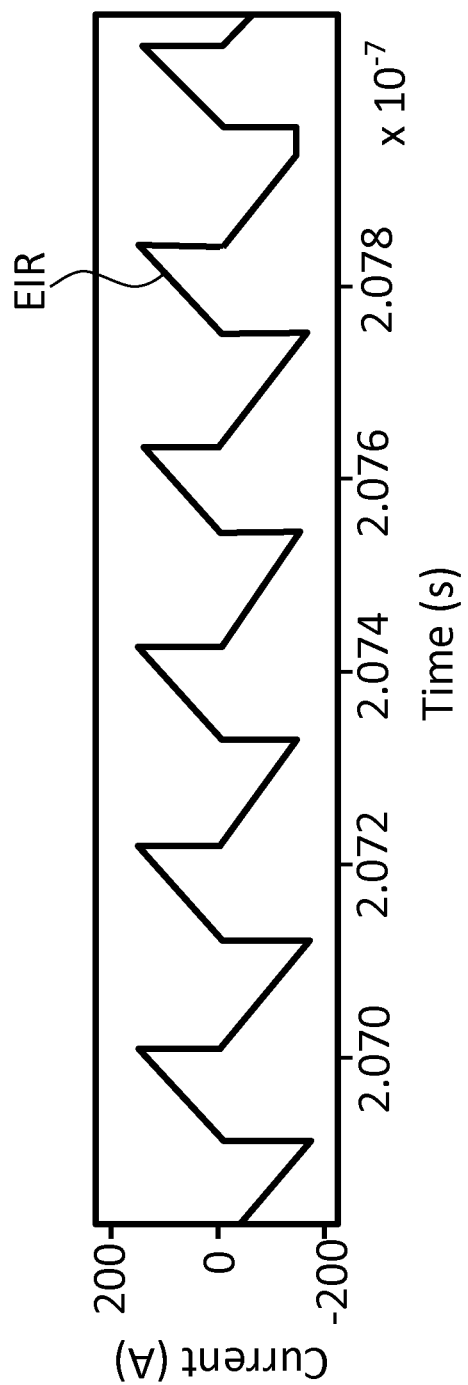
FIG. 2 shows a schematic diagram of an estimated inductor current ripple based on the measured inductor voltage according to an example.

FIG. 2 shows a schematic diagram of the estimated inductor current ripple based on the measured inductor voltage according to an exemplary embodiment of the present invention with characteristic deviations due to parasitic elements. On the y-axis of FIG. 2 the current values, in amperes, are presented ranging from −200 A to +200 A, on the x-axis as shown in FIG. 2, the time in seconds is presented.

According to an exemplary embodiment of the present invention, in FIG. 2, the estimated inductor current ripple EIR is shown over time representing a discontinuous triangle-like waveform. In order to cancel or reduce the ripple, it may be necessary to shift the discontinuous triangle-like waveform so that the discontinuous triangle-like waveform has its average value below a certain threshold also locally, within a rising or falling slope.

According to an exemplary embodiment of the present invention, for instance, the certain threshold may be set to zero. For example, only the ripple shall be cancelled, not the average value of the discontinuous triangle-like waveform. The proper shift can be computed using the instantaneous value of the duty cycle and the inductor voltage of the power converter. This is half of the peak-to-peak ripple.

The following Equation (1) may be used to calculate the shift:

$$\Delta i_{Lpp} = \frac{v_L}{L} DT \rightarrow \text{Offset} = -\frac{v_L}{2L} DT \qquad (1)$$

With this value, the discontinuous triangle-like waveform can be converted into a continuous zero-average waveform or a waveform yielding the threshold when averaged.

Figure 3:
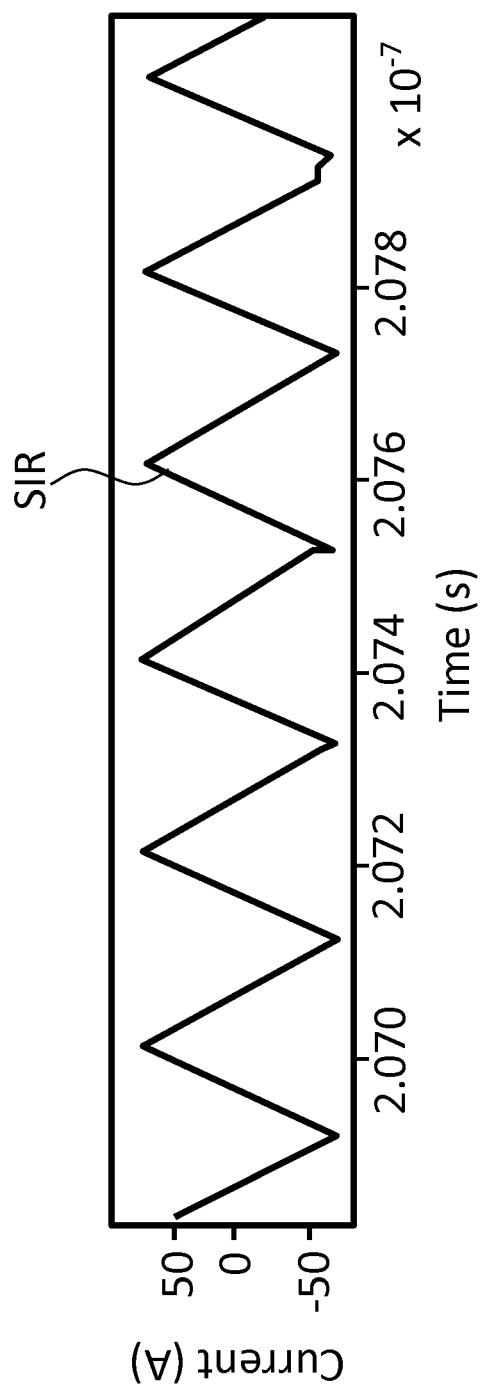
FIG. 3 shows a schematic diagram of a shifted inductor current ripple according to an example.

FIG. 3 shows a schematic diagram of the shifted inductor current ripple according to an exemplary embodiment of the present invention. In FIG. 3, the shifted inductor current ripple SIR is provided as a continuous zero-average waveform. The y-axis of the diagram as shown in FIG. 3 depicts the current in amperes ranging from −50 A to +50 A, the x-axis gives the time in seconds.

Figure 4:
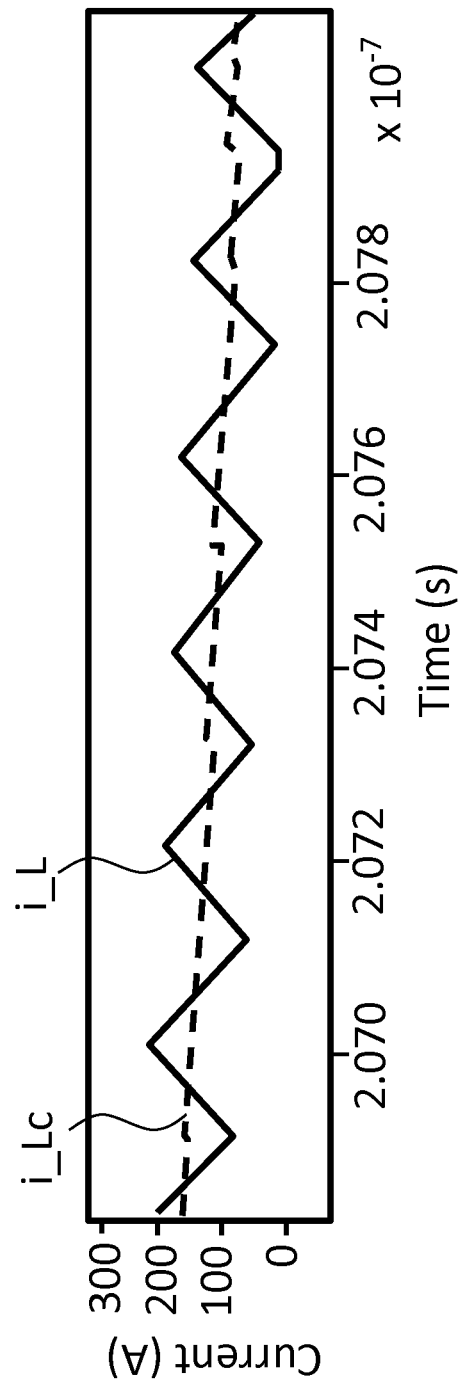
FIG. 4 shows a schematic diagram of the measured and the corrected inductor current according to an example.

FIG. 4 shows a schematic diagram of the measured inductor current i_L and corrected inductor current i_Lc according to an exemplary embodiment of the present invention.

On the y-axis of FIG. 4 the current values, in amperes, are presented ranging from 0 A to +300 A, on the x-axis as shown in FIG. 4, the time in seconds is presented.

In FIG. 4, the measured inductor current i_L as indicated by the solid line and the corrected inductor current i_Lc are shown. The corrected inductor current i_Lc is given by the dashed line; it may be calculated by subtracting the continuous zero-average waveform as represented by the shifted inductor current ripple SIR from the measured inductor current i_L.

According to an exemplary embodiment of the present invention, the behavior of the inductors and switches of the switched-mode power converters may also be considered. For instance, the waveforms may be not triangle-like but also steep exponential functions.

According to an exemplary embodiment of the present invention, further terms may be included in equation 1, for instance resistive losses.

Figure 5:
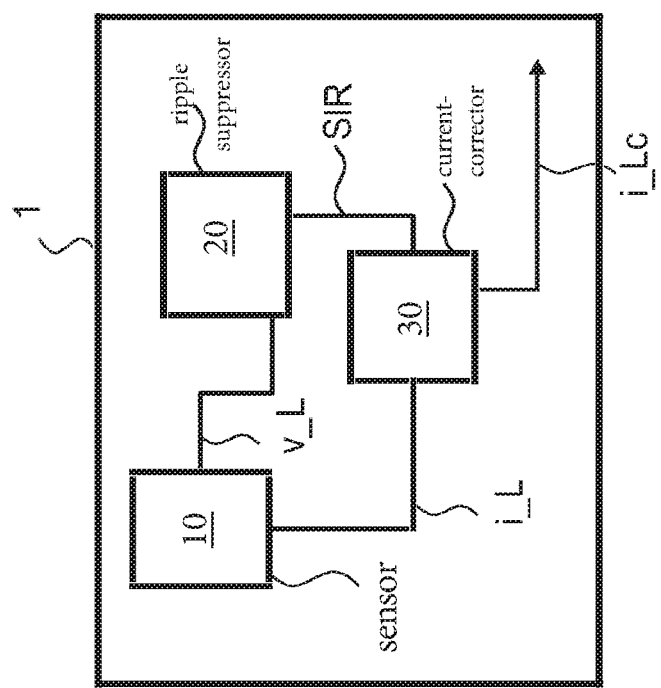
FIG. 5 shows a schematic diagram of the device for estimating an average value of an inductor current for switched-mode power converters according to an example.

FIG. 5 shows a schematic diagram of a device for estimating an average value of an inductor current for switched-mode power converters according to an exemplary embodiment of the present invention.

The device 1 for estimating an average value of an inductor current for switched-mode power converters 100 may comprise a sensor 10, a ripple suppressor 20, and a current-corrector 30.

The sensor 10 may be configured to measure an inductor voltage v_L and an inductor current i_L.

The sensor 10 may comprise a voltmeter device configured to measure the inductor voltage v_L and an ammeter device configured to measure an inductor current i_L.

The ripple suppressor 20 may be configured to provide an estimated inductor current ripple EIR based on the measured inductor voltage v_L.

According to an exemplary embodiment, the ripple-suppressor 20 may be configured to shift the estimated inductor current ripple EIR providing a shifted inductor current ripple SIR.

According to an exemplary embodiment of the present invention, the ripple-suppressor 20 may be configured to provide the estimated inductor current ripple EIR by integration of the measured inductor voltage v_L, for instance an integration over time.

According to an exemplary embodiment of the present invention, the ripple-suppressor 20 may be configured to provide the estimated inductor current ripple EIR by scaling the integration of the measured inductor voltage v_L with an inductance of an inductor L1 of the power converter 100, the inductance of the inductor L1 may be normalized to a certain scale prior to the scaling.

According to an exemplary embodiment of the present invention, the current-corrector 30 may be configured to provide a corrected inductor current i_Lc based on the estimated inductor current ripple EIR and the measured inductor current i_L.

According to an exemplary embodiment, the current-corrector 30 is configured to subtract the shifted inductor current ripple SIR from the measured inductor current i_L providing the corrected inductor current i_Lc.

Figure 6:
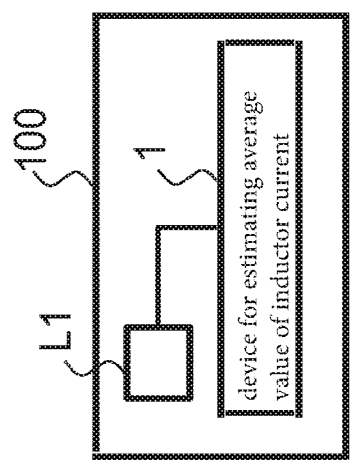
FIG. 6 shows a schematic diagram of a power converter according to an example.

FIG. 6 shows a schematic diagram of a power converter according to an exemplary embodiment of the present invention.

A power converter 100 may comprise at least one device 1 for estimating an average value of an inductor current for switched-mode power converters 100 and at least one inductor L1. The power converter 100 may be a switched-mode power converter.

Figure 7:
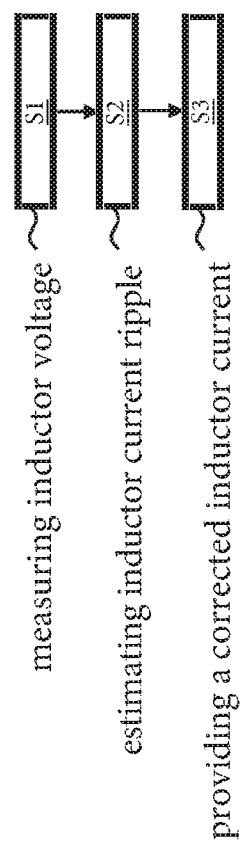
FIG. 7 shows a schematic flow-chart diagram of a method for estimating an average value of an inductor current for switched-mode power converters according to an example.

FIG. 7 shows a schematic flow-chart of a method for estimating an average value of an inductor current for switched-mode power converters according to an exemplary embodiment of the present invention.

The method for estimating an average value of an inductor current for switched-mode power converters may comprise the following steps:

As a first step of the method, measuring S1 an inductor voltage v_L and an inductor current i_L may be conducted.

As a second step of the method, providing S2 an estimated inductor current ripple EIR based on the measured inductor voltage v_L may be conducted.

As a third step of the method, providing S3 a corrected inductor current i_Lc based on the estimated inductor current ripple EIR and the measured inductor current i_L may be conducted.

According to an exemplary embodiment of the present invention, shifting the estimated inductor current ripple for providing the shifted inductor current ripple SIR may be conducted.

According to an exemplary embodiment of the present invention, the step of providing S2 the estimated inductor current ripple EIR comprises providing the estimated inductor current ripple EIR by integration of the measured inductor voltage v_L.

According to an exemplary embodiment of the present invention, the step of providing S2 the estimated inductor current ripple EIR comprises scaling the integration of the measured inductor voltage v_L with an inductance of an inductor L1 of the power converter 100.

It has to be noted that embodiments of the present invention are described with reference to different subject-matters. In particular, some embodiments are described with reference to method type claims whereas other embodiments are described with reference to device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined comprising synergetic effects that are more than the simple summation of these features.

While the present invention has been illustrated and described in detail in the drawings and the foregoing description, such illustration and description are to be considered illustrative or exemplary and not restrictive; the present invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A device for estimating an average value of an inductor current or corrected inductor current for a power converter, the device comprising:
   a sensor configured to measure an inductor voltage and an inductor current;
   a ripple-suppressor configured to provide an estimated inductor current ripple based on the measured inductor voltage by integration of the measured inductor voltage; and
   a current-corrector configured to provide the corrected inductor current based on the estimated inductor current ripple and the measured inductor current, wherein the ripple-suppressor is configured to reset the integration when the inductor voltage is switched, and wherein the ripple-suppressor is configured to shift, within a switching state of the converter, the estimated inductor current ripple down using an offset equal to approximately one-half of a peak inductor current ripple when the estimated inductor current ripple has a positive slope and up using the offset when the estimated inductor current ripple has a negative slope, thereby providing a shifted inductor current ripple.

2. The device according to claim 1, wherein the ripple-suppressor is configured to provide the estimated inductor current ripple by scaling the integration of the measured inductor voltage using an inductance of an inductor in the power converter.

3. The device according to claim 1, wherein the current-corrector is configured to subtract the shifted inductor current ripple from the measured inductor current, thereby providing the corrected inductor current.

4. The device according to claim 1, wherein the ripple-suppressor is configured to shift the estimated inductor current ripple using an instantaneous value of a duty cycle of the power converter.

5. The device according to claim 1, wherein the ripple-suppressor is configured to shift the estimated inductor current ripple using the inductor voltage of the power converter.

6. A power converter, comprising:
   an inductor having an inductor current flowing through the inductor; and
   a device for estimating an average value of the inductor current, the device comprising:
     a sensor configured to measure an inductor voltage and the inductor current;
     a ripple-suppressor configured to provide an estimated inductor current ripple based on the measured inductor voltage by integration of the measured inductor voltage; and
     a current-corrector configured to provide the corrected inductor current based on the estimated inductor current ripple and the measured inductor current, wherein the ripple-suppressor is configured to reset the integration when the inductor voltage is switched, and wherein the ripple-suppressor is configured to shift, within a switching state of the converter, the estimated inductor current ripple down using an offset equal to approximately one-half of a peak inductor current ripple when the estimated inductor current ripple has a positive slope and up using the offset when the estimated inductor current ripple has a negative slope, thereby providing a shifted inductor current ripple.

7. The power converter according to claim 6, wherein the power converter is included in a high power pre-regulator for generating X-rays.

8. A method for estimating an average value of an inductor current or corrected inductor current for a power converter, the method comprising:
  measuring an inductor voltage and an inductor current;
  providing an estimated inductor current ripple based on the measured inductor voltage by integration of the measured inductor voltage; and
  providing the corrected inductor current based on the estimated inductor current ripple and the measured inductor current by:
    resetting the integration when the inductor voltage is switched; and
    shifting, within a switching state of the converter, the estimated inductor current ripple down using an offset equal to approximately half of a peak inductor ripple current when the estimated inductor current ripple has a positive slope and up using the offset when the estimated inductor current ripple has a negative slope, thereby providing a shifted inductor current ripple.

9. The method according to claim 8, further comprising scaling the integration of the measured inductor voltage using an inductance of an inductor of the power converter.

10. A non-transitory computer-readable medium having one or more executable instructions, which, when executed by a processor, cause the processor to perform a method for estimating an average value of an inductor current or corrected inductor current for a power converter, the method comprising:
  measuring an inductor voltage and an inductor current;
  providing an estimated inductor current ripple based on the measured inductor voltage by integration of the measured inductor voltage; and
  providing the corrected inductor current based on the estimated inductor current ripple and the measured inductor current by:
    resetting the integration when the inductor voltage is switched; and
    shifting, within a switching state of the converter, the estimated inductor current ripple down using an offset equal to approximately one-half of a peak inductor ripple current when the estimated inductor current ripple has a positive slope and up using the offset when the estimated inductor current ripple has a negative slope, thereby providing a shifted inductor current ripple.

* * * * *